United States Patent
Inoue et al.

(10) Patent No.: US 7,098,448 B2
(45) Date of Patent: Aug. 29, 2006

(54) METHOD AND APPARATUS FOR MEASURING BEAM SPOT OF SCANNING LIGHT

(75) Inventors: Nozomu Inoue, Nagano (JP); Takeshi Sowa, Nagano (JP); Yoichi Mitsui, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/077,997

(22) Filed: Mar. 11, 2005

(65) Prior Publication Data

US 2005/0199814 A1    Sep. 15, 2005

(30) Foreign Application Priority Data

Mar. 12, 2004    (JP)    ............................. P2004-070000

(51) Int. Cl.
*H01J 3/14* (2006.01)
*H01J 40/14* (2006.01)
*H01J 5/16* (2006.01)

(52) U.S. Cl. ........................ 250/234; 347/225; 358/474

(58) Field of Classification Search ........ 250/234–236; 358/474–498; 347/129–140, 224–264

See application file for complete search history.

(56) References Cited

U.S. PATENT DOCUMENTS 6,744,037 B1 * 6/2004 Yoshikawa et al. .......... 250/234

FOREIGN PATENT DOCUMENTS

| JP | 53-031147 | 3/1978 |
|----|-----------|--------|
| JP | 64-013514 | 1/1989 |
| JP | 06-118329 | 4/1994 |
| JP | 6-070583  | 9/1994 |
| JP | 07-020395 | 1/1995 |
| JP | 08-227047 | 9/1996 |
| JP | 2876650   | 1/1999 |
| JP | 3050996   | 3/2000 |
| JP | 2000-292308 | 10/2000 |
| JP | 2002-086975 | 3/2002 |

* cited by examiner

Primary Examiner—Stephone B. Allen
Assistant Examiner—Patrick J. Lee
(74) Attorney, Agent, or Firm—Hogan & Hartson LLP (57) ABSTRACT

In order to measure a characteristics of a light beam which is repetitively deflected by a light scanning device within a first range in a first direction at a first velocity, there is provided a plate formed with at least one slit extending in a direction angled from the first direction and having a constant width. The plate is moved within the first range in the first direction at a second velocity which is sufficiently lower than the first velocity. A peak value of an optical power of light passing through the slit every time is detected when the deflected light beam crosses the slit being moved, thereby obtaining peak values at plural positions in the first direction. The peak values are displayed on a screen collectively in such a manner that positions on the screen correspond to the positions in the first direction.

18 Claims, 11 Drawing Sheets

METHOD AND APPARATUS FOR MEASURING BEAM SPOT OF SCANNING LIGHT

BACKGROUND OF THE INVENTION

The present invention relates to a method and an apparatus for measuring a beam spot of scanning light, and more particularly to a method and an apparatus capable of continuously measuring and displaying properties of the scanning light such as a shape of the beam spot, which change in a primary scanning direction and a light advancing direction.

The followings are well-known techniques for measuring the properties of the scanning light such as the beam spot shape.

It is on sale "Beam Alyzer" manufactured by the Melles Griot Inc., wherein a knife edge is provided on a rotary drum, and a section profile and a spot size of a beam spot are measured on the basis of optical power variation when an incident light beam crosses the knife edge. It is also on sale "Beam Scan" manufactured by Photon Inc., wherein a focal condition of an incident light beam is similarly measured by a narrow slit provided on a rotary drum.

However, these apparatuses can measure only a stationary light beam. Further, in a case where the spot shape is different between the stationary state and the scanned state, accurate results cannot be obtained. For example, in a case where a dynamic pressure bearing motor is used in a light deflector (a light scanning device), the posture of an axis is actually different in a stationary state and a rotating state. Moreover, a mechanism for accurately positioning a beam in the light receiving portion of a sensor is necessary and a time is required for carrying out a positioning operation.

Japanese Patent Publication No. 53-31147A discloses a scanning optical system in which a light beam is incident on a polygon mirror at an angle which is not perpendicular to a secondary scanning direction. In this optical system, the light beam tends to be twisted.

Japanese Patent Publication No. 64-13514A teaches that a spot size in a primary scanning direction and a secondary scanning direction with a vertical slit extending in the secondary scanning direction and an oblique slit inclined to a direction parallel to a scanning line.

Japanese Patent Publication No. 6-70583B teaches that a major axis diameter, a minor axis diameter and an inclined angle are calculated with three slits including one vertical slit and two oblique slits. It is based on an assumption that the beam spot is elliptical.

Japanese Patent No. 2876650 discloses that an inclined angle and dimensions in a primary scanning direction and a secondary scanning direction of an elliptical beam spot are simultaneously calculated with three slits including a vertical slit extending in the secondary scanning direction and two oblique slits. It is also disclosed that two vertical slits are provided to calculate a scanning velocity which is to be used to calculate the spot size. It is further disclosed a combination of two slits each of which has a vertical edge and an oblique edge.

Japanese Patent No. 3050996 discloses that a spot size in a primary scanning direction and a scanning velocity are measured with a slit extending in a secondary scanning direction. It is also disclosed that a spot size in a secondary scanning direction is measured with two pairs of slits which are slightly inclined from the primary scanning direction. Here, the extending direction of the slits are matched with the scanning direction of the light beam. It is further disclosed that a pair of oblique slits extending in two directions are provided to eliminate effect caused by an error in an angle formed by the scanning line and the slits. The inclined angle of the elliptical spot is out of consideration.

Japanese Patent Publication No. 6-118329A discloses that irregularity of the pitch of the scanning lines is measured with a one-dimensional linear array CCD sensor.

Japanese Patent Publication No. 2000-292308A discloses that fluctuations of the position of the scanning line in a secondary scanning direction is measured with a triangular slit.

Besides, it is well-known that the optical power is measured with a power meter. However, also in this case, a mechanism for accurately positioning a beam in the light receiving portion of a sensor is necessary and a time is required for carrying out a positioning operation.

In an electrophotography, a change in a density is represented by the size of a halftone dot or the thickness of a line in order to carry out gradation recording. In the former case, the dots are arranged regularly in an oblique direction. In the latter case, oblique lines parallel with neither a primary scanning direction nor a secondary scanning direction are used. In a case where multicolor printing is to be carried out, the directions of the dot arrays or the lines are varied color by color.

In that case, if an almost elliptical focal spot (beam spot) is inclined obliquely, the density tends to be increased when an inclined angle approaches to the angle of the dot arrays or the lines, and the density tends to be reduced when the inclined angle is turned in a different direction. When the inclined angle of the focal spot is varied depending on a position in the primary scanning direction, the density or tone is changed depending on a change in the inclined angle. In case of a halftone image in which two colors overlap each other, one of the colors becomes dark and the other color becomes light depending on an inclination of the major axis of the elliptical spot when the directions of screens of two colors (the direction of the dot arrays or the lines) are different from each other. When the inclination in the direction of the major axis of the elliptical spot is varied depending on a position in the primary scanning direction, the color of the halftone image is changed depending on the position. Human eyes are more sensitive to a change in coloring (tone/hue) than a change in the density of a single color. For this reason, it is necessary to continuously evaluate the inclined angle of the major axis of the elliptical spot in the primary scanning direction.

In the prior art described above, the inclined angle of the spot can be measured in a specific position in the primary scanning direction, but continuous evaluation throughout in the primary scanning direction cannot be executed. Even if a plurality of measuring points are provided, long time is required for the measurement. Even if measuring data are quantitatively obtained, since numeral data are merely enumerated, it is hard to instinctively and visually recognize a problematic situation. Furthermore, it is impossible to measure a large number of measuring items once at a time.

SUMMARY OF THE INVENTION

It is therefore an object of the invention to provide a method and an apparatus for continuously measuring a focal condition such as a beam spot shape.

In order to achieve the above object, according to the invention, there is provided a measuring method, comprising steps of:

providing a light scanning device, operable to repetitively deflect a light beam within a first range in a first direction at a first velocity;

providing a plate formed with at least one slit extending in a direction angled from the first direction and having a constant width;

moving the plate within the first range in the first direction at a second velocity which is sufficiently lower than the first velocity;

detecting a peak value of an optical power of light passing through the slit every time when the deflected light beam crosses the slit being moved, thereby obtaining peak values at plural positions in the first direction; and displaying the peak values on a screen collectively in such a manner that positions on the screen correspond to the positions in the first direction.

Preferably, the width of the slit is narrower than a dimension in the first direction of a beam spot formed by the deflected light beam incident on the plate. Here, the slit extends in a direction perpendicular to the first direction. With this configuration, it is possible to continuously measure a focal condition of the beam spot in the first direction.

Preferably, the plate is formed with a plurality of slits extending in directions different from each other. Here, the width of each of the slits is narrower than a dimension in the first direction of a beam spot formed by the deflected light beam incident on the plate. With this configuration, it is possible to continuously measure a focal condition of the beam spot in oblique directions relative to the first direction.

Preferably, the width of the slit is wider than a dimension in the first direction of a beam spot formed by the deflected light beam incident on the plate. Here, the slit extends in a direction perpendicular to the first direction. With this configuration, it is possible to continuously measure an optical power distribution of the beam spot in the first direction.

According to the invention, there is also provided a measuring method, comprising steps of:

providing a light scanning device, operable to repetitively deflect a light beam within a first range in a first direction at a first velocity;

providing a plate formed with at least one slit extending in a direction angled from the first direction and having a constant width;

moving the plate along an optical axis of the light scanning device or the deflected light beam at a specific position within the first range and at a second velocity which is sufficiently lower than the first velocity;

detecting a peak value of an optical power of light passing through the slit every time when the deflected light beam crosses the slit being moved, thereby obtaining peak values at plural positions in the first direction; and displaying the peak values on a screen collectively in such a manner that positions on the screen correspond to the positions in the first direction.

With this configuration, it is possible to continuously measure a beam waist position in a direction of an optical axis of the light scanning device or the axial direction of the light beam.

In the above methods, it is preferable that the deflection of the light beam is based on a synchronization signal, and the peak values are collectively displayed with reference to the synchronization signal.

In the above methods, it is preferable that the first velocity is lower than a velocity that the light scanning device deflects the light beam in an actual use.

According to the invention, there is also provided an apparatus for measuring a characteristics of a light beam which is repetitively deflected by a light scanning device within a first range in a first direction at a first velocity, comprising:

a plate, having a first face opposing to the light scanning apparatus and formed with at least one slit extending in a direction angled from the first direction and having a constant width;

an optical sensor, disposed so as to oppose to a second face of the plate which is opposite to the first face;

an actuator, which integrally moves the plate and the optical sensor within the first range in the first direction at a second velocity which is sufficiently lower than the first velocity, so that a peak value of an optical power of light passing through the slit every time when the deflected light beam crosses the slit being moved, thereby causing the optical sensor to output peak values at plural positions in the first direction; and a display, having a screen adapted to collectively display the peak values sent from the optical sensor, in such a manner that positions on the screen correspond to the positions in the first direction with reference to the synchronization signal.

According to the invention, there is also provided an apparatus for measuring a characteristics of a light beam which is repetitively deflected by a light scanning device within a first range in a first direction at a first velocity, comprising:

a plate, having a first face opposing to the light scanning apparatus and formed with at least one slit extending in a direction angled from the first direction and having a constant width;

an optical sensor, disposed so as to oppose to a second face of the plate which is opposite to the first face;

an actuator, which integrally moves the plate along an optical axis of the light scanning device or the deflected light beam at a specific position within the first range and at a second velocity which is sufficiently lower than the first velocity, so that a peak value of an optical power of light passing through the slit every time when the deflected light beam crosses the slit being moved, thereby causing the optical sensor to output peak values at plural positions in the first direction; and a display, having a screen adapted to collectively display the peak values sent from the optical sensor, in such a manner that positions on the screen correspond to the positions in the first direction with reference to the synchronization signal.

According to the invention, it is possible to continuously and visually evaluate the shape of the beam spot of the light beam being scanned within the scanning range. Ultimately, the characteristics of the light scanning device can be evaluated with a single device.

BRIEF DESCRIPTION OF THE DRAWINGS

The above objects and advantages of the present invention will become more apparent by describing in detail preferred exemplary embodiments thereof with reference to the accompanying drawings, wherein:

FIGS. 7A through 8B are views for explaining measured results in a case where an inclined angle of a beam spot varies continuously;

DETAILED DESCRIPTION OF THE INVENTION

Embodiments of the invention will be described below in detail with reference to the accompanying drawings.

Figure 1:
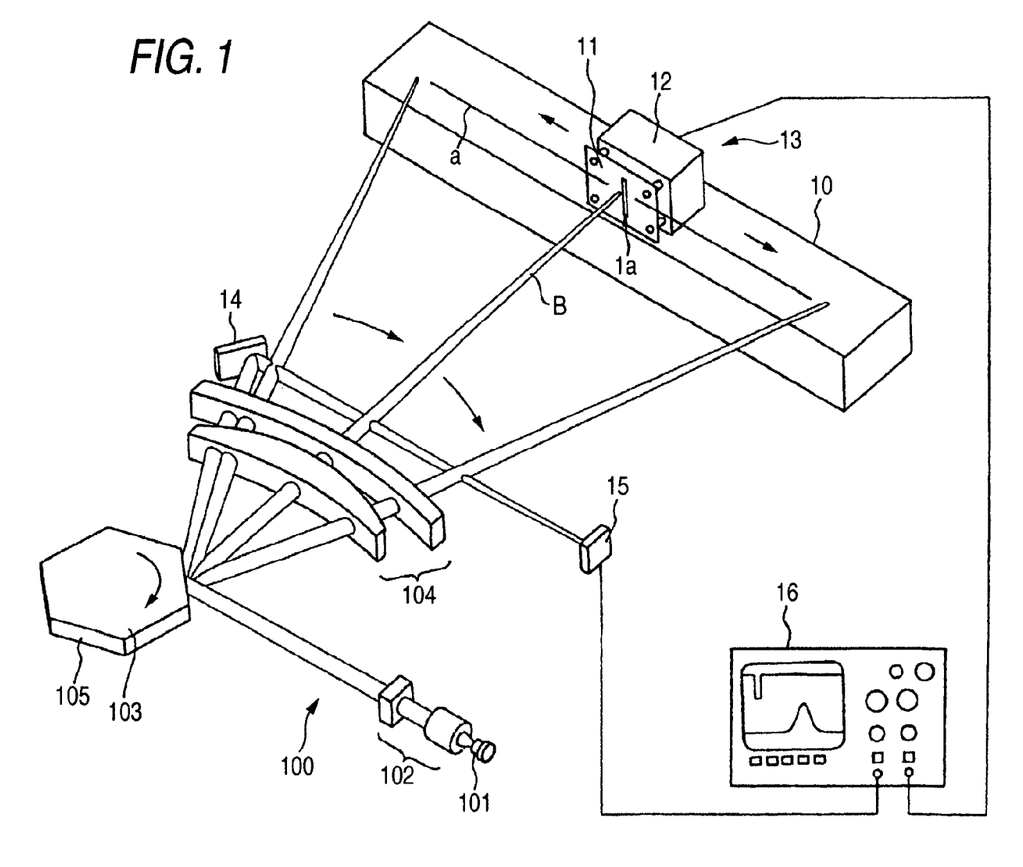
FIG. 1 is a schematic view of a measuring apparatus according to a first embodiment of the invention.

FIG. 1 shows a first embodiment of the invention which is an apparatus for measuring a focal condition of a scanning light beam. In this embodiment, a light scanning device 100 comprises a light source 101, a lens unit 102, a polygon mirror 103 and a scanning optical system 104. A light beam emitted from the light source 101 is converted into a parallel light beam by the lens unit 102, and incident on the reflection face 105 of the polygon mirror 103. The light beam is reflected and deflected by the reflection face 105 is converted into a scanning light beam B deflected in the direction of an arrow through the scanning optical system 104, and is focused on a scanned face. In a case where it is adopted an optical system for correcting a pyramidal angle error of a polygon mirror, the light beam emitted from the light source 101 is converted into a parallel light beam relative to a direction perpendicular to a rotation axis of the polygon mirror while being converted into a light beam to be focused in the vicinity of the reflection face of the polygon mirror relative to a direction parallel to the rotation axis of the polygon mirror.

The reflection face 105 is rotated around the rotation axis of the polygon mirror 103. Therefore, the scanning light beam B is deflected at a velocity which is double of the rotating velocity the reflection face 105, thereby drawing a scanning line "a" on the scanned face. With the rotation of the polygon mirror 103, adjacent reflection faces are sequentially subjected to the incidence of the light beam emitted from the light source 101. Therefore, the scanning light beam B repetitively draws the scanning line "a" from one of ends to the other in the same position over the scanned face with the rotation of the polygon mirror 103.

In this embodiment, the measuring apparatus comprises: a motorized stage 10 provided along the scanned face of the light scanning device 100; and a movable table 13 attached onto the stage 10 and moved at a constant velocity in a primary scanning direction along the scanning line "a". A slit plate 11 provided on the incidence side of the scanning light beam B and an optical sensor 12 provided therebehind are integrated and attached on the movable table 13, so that they are moved in the primary scanning direction along the scanning line "a" with the movement of the movable table 13. Moreover, a mirror 14 is provided on an upstream end in the defecting direction of the scanning light beam B and a light reflected by the mirror 14 is incident on a horizontal synchronization detector (optical sensor) 15.

A connection is carried out in such a manner that a signal sent from the horizontal synchronization detector 15 is input as a horizontal synchronization signal to an oscilloscope 16 and a signal sent from the optical sensor 12 is input as the signal of the oscilloscope 16.

In such an arrangement, a signal waveform sent from the optical sensor 12 and the horizontal synchronization signal sent from the horizontal synchronization detector 15 are collectively displayed while using the horizontal synchronization signal as a trigger.

Figure 2A:
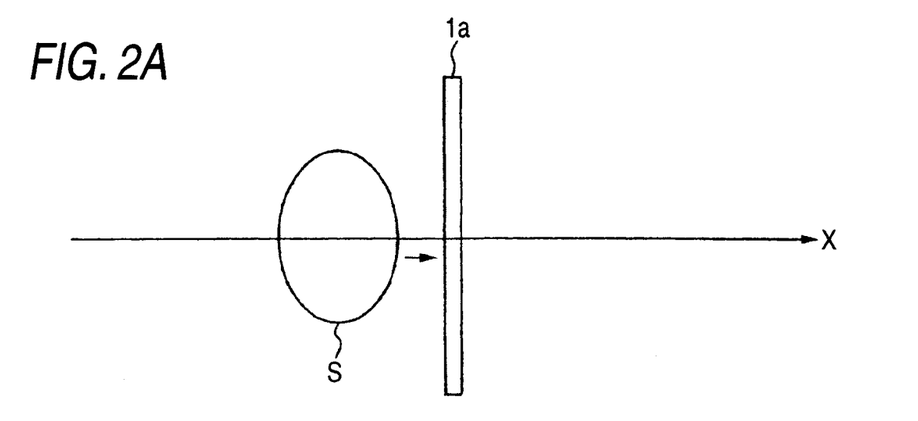
FIGS. 2A to 2C are diagrams for explaining a measurement principle of the apparatus shown in FIG. 1.
Figure 2B:
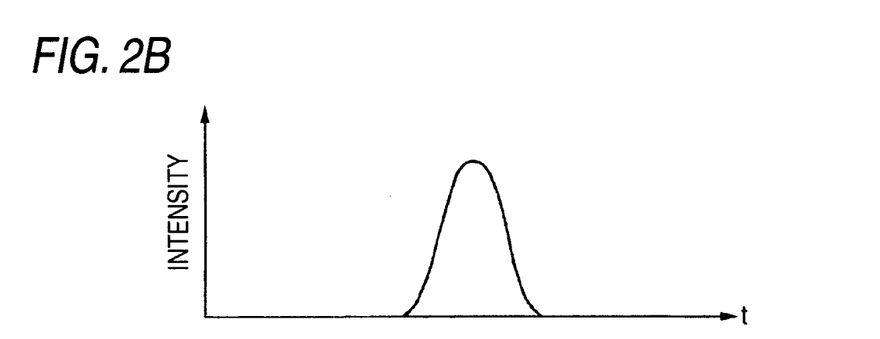
Figure 2C:
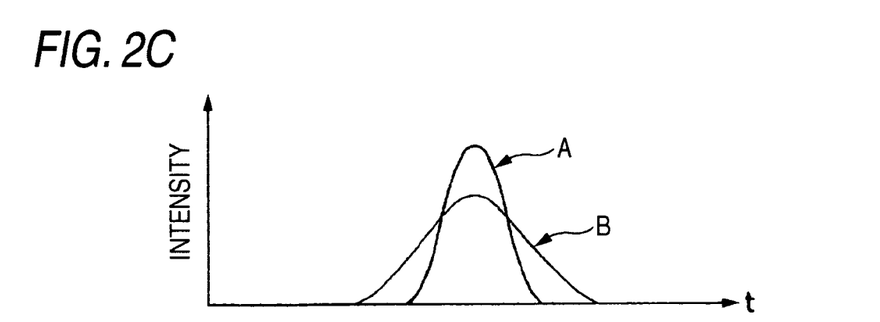

The principle of the measurement will be described below. FIG. 2A shows a relationship between a slit 1 a provided on the slit plate 11 and a beam spot S formed on the slit plate 11. The direction of the scanning line "a" (the primary scanning direction) is set to be an x-axis. In this case, the slit 1a extends in an orthogonal direction to the x-axis. In a case where the moving velocity of the slit plate 11 is sufficiently lower than that of the scanning light beam B, a light intensity signal of the beam spot S can be obtained at the optical sensor 12 provided behind the slit plate 11 as if the beam spot S had moved over a fixed slit. An optical power waveform is shown in FIG. 2B. An axis of abscissa t indicates a time. Herein, the width of the slit 1a is smaller than the dimension of the beam spot S. The optical power waveform is almost similar to the optical power profile of the beam spot S. Based on the assumption that the power of the beam spot S is equal, the width of a waveform is reduced and the height of a peak is increased as in a waveform A in FIG. 2C when a spot size is small, that is, an focal condition is excellent. When the spot size is large on the other hand, that is, the focal condition is not very excellent, the width of the waveform is increased and the height of the peak is reduced as in a waveform B in FIG. 2C.

Figure 3:
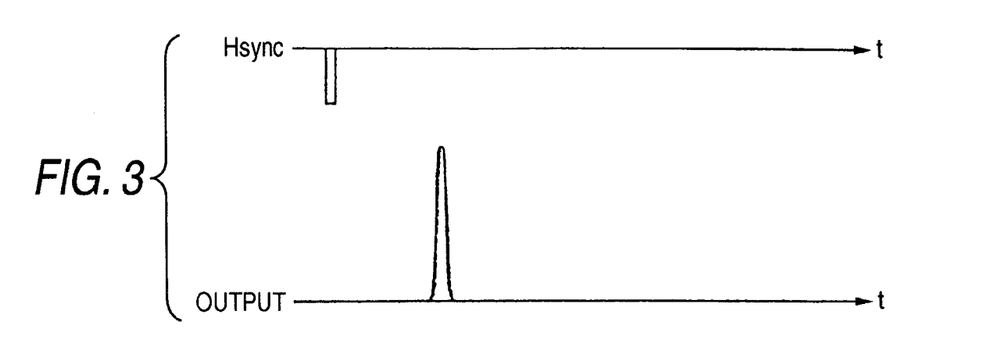
FIG. 3 is a time chart showing a measured result when the scanning light is once deflected.
Figure 4:
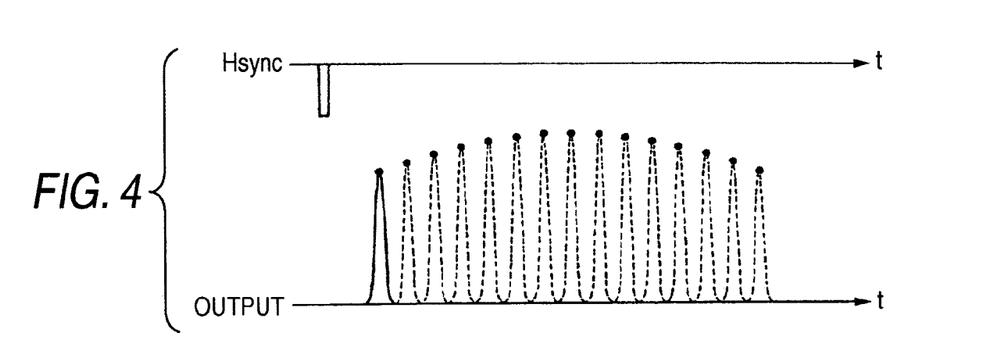
FIG. 4 is a time chart showing a measured result when the scanning light is deflected a plurality of times.

FIG. 3 shows the output waveform of a signal sent from the optical sensor 12 based on a horizontal synchronization signal $H_{sync}$ sent from the horizontal synchronization detector 15 in a case where the scanning light beam B is once deflected. An output waveform is obtained from the optical sensor 12 with a delay from the position of the horizontal synchronization signal $H_{sync}$ by a time depending on the position of the slit 1a in the x direction. The slit plate 11 is moved at a sufficiently lower velocity than the moving velocity of the scanning light beam B. Since the light scanning device 100 deflects the scanning light beam B periodically and repetitively, when the horizontal synchronization signal $H_{sync}$ is used as a trigger, the output waveform of the optical sensor 12 corresponding to the latter deflection (latter position on the scanning line) is displayed on the screen of the oscilloscope 16 at a position farther from the horizontal synchronization signal $H_{sync}$ as shown in FIG. 4. Here, a curve connecting the peak values of the thus obtained output signals shows a change in the peak intensity of the beam spot S in the primary scanning direction. Thus, it is possible to continuously measure a change in the focal condition of the scanning light beam B within a scanning range by consecutively acquiring the peak value of the output waveform every deflection of the scanning light beam B while moving the slit 1a at a sufficiently low velocity in the primary scanning direction. As shown in FIG. 4, the peak values are collectively displayed with reference to the horizontal synchronization signal $H_{sync}$ of the light scanning device 100 so that the change in the focal condition in the primary scanning direction can be grasped visually.

Figure 5:
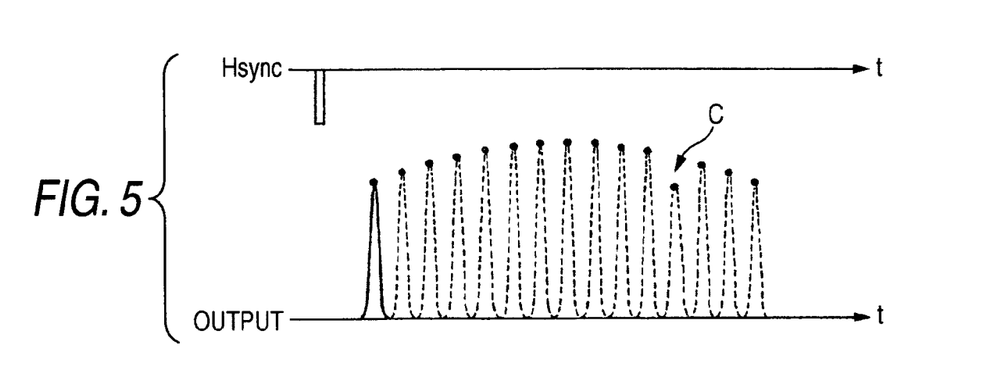
FIG. 5 is a time chart showing a measured result when an optical system includes a defect.

In some cases, for example, a local irregularity C is detected in the curve connecting the peak values as shown in FIG. 5. Such a fluctuation is caused by a very small flaw in an optical system, a defect in a lens, a low figure accuracy of lens, dust or shading. As will be described below (FIGS. 11 and 12), the fluctuation caused by the dust or the shading is detected also in a measurement using a thick slit, however, the very small flaw in an optical system, the defect in a lens and the low figure tolerance can be detected by only this method. In a conventional method for carrying out the measurement on a sampling basis in a specific position in the primary scanning direction, it is hard to detect the local irregularity. Also in this respect, the method according to the invention is advantageous.

As a matter of course, in this case, it is also possible to measure the spot size of the beam spot S in the primary scanning direction by measuring a width having a predetermined level of the output waveform for the optical power passing through the slit 1a in the same manner as in the conventional art.

In a case where the response characteristics of a detecting system constituted by the slit 1a and the optical sensor 12 are insufficient, it is possible to carry out a detection by causing the scanning (moving) velocity of the scanning light beam B in the light scanning device 100 to be lower than that in an actual use.

In this embodiment, the slit 1a is extended in the secondary scanning direction which is orthogonal to the x-axis. However, the extending direction of the slit 1 a may be inclined relative to the primary scanning direction. In this case, a spot size of the beam spot S in the oblique direction relative to the primary scanning direction or an inclined angle of the beam spot S can be continuously measured and evaluated. This case will be described below in detail as a second embodiment of the invention.

Figure 6:
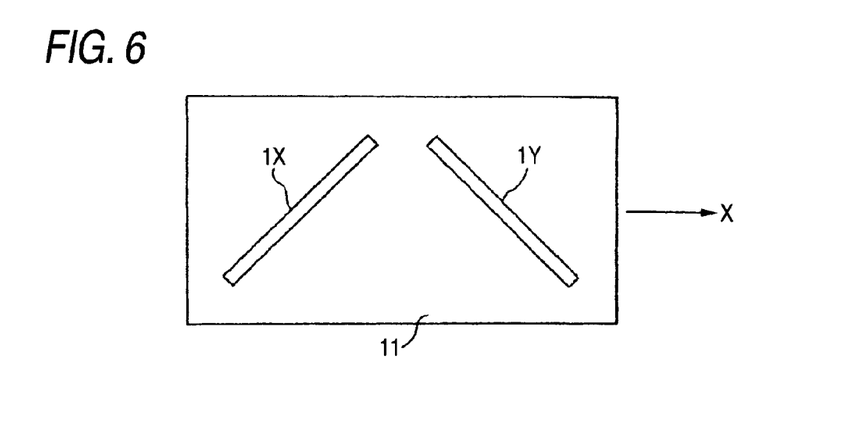
FIG. 6 is a plan view of a slit plate in a measuring apparatus according to a second embodiment of the invention.

As shown in FIG. 6, in the arrangement of FIG. 1, there is used a slit plate 11 in which a slit 1X and a slit 1Y are arranged in the primary scanning direction. The slit 1X extends in a direction inclined by +45 degrees (clockwise) from the secondary scanning direction. The slit 1Y extends in a direction inclined by −45 degrees (counterclockwise) from the secondary scanning direction. Herein, the slit widths in the primary scanning direction of the slits 1X and 1Y are smaller than a dimension in the primary scanning direction of the beam spot S. By using the slit plate 11, a movement is carried out in the primary scanning direction at a sufficiently lower velocity than the moving velocity of the scanning light beam B. By acquiring outputs from the two oblique slits at the same time, a detailed characteristic in the oblique direction of a the beam spot S can be obtained.

Figure 7A:
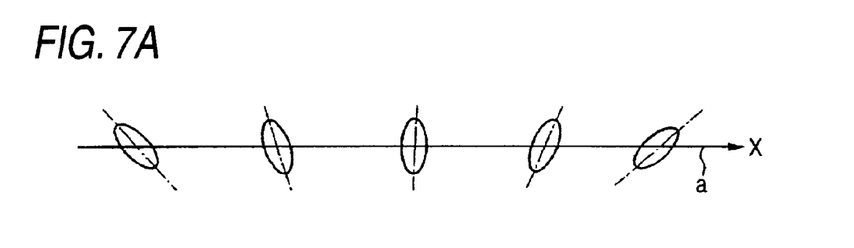
Figure 7B:
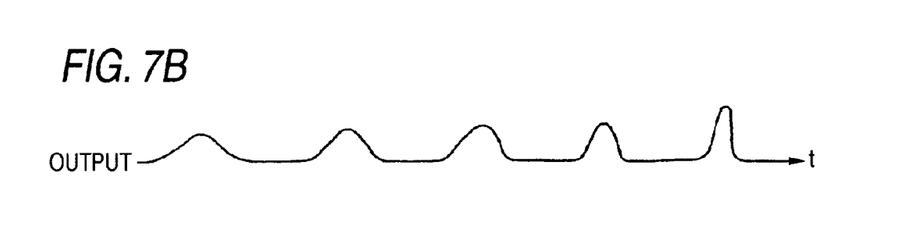
Figure 7C:
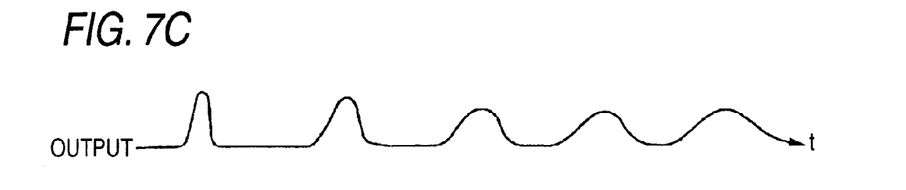

In a case where the shape of the beam spot S along the scanning line "a" (x-axis) is continuously changed from left to right within a scanning range such that the inclination of the major axis of an ellipse is consecutively changed from a leftward and upward direction to a rightward and upward direction as shown in FIG. 7A, an output waveform to be detected through the slit 1X is obtained as shown in FIG. 7B and an output waveform to be detected through the slit 1Y is obtained as shown in FIG. 7C. In the output waveform detected through the slit 1X, the width of the waveform is gradually decreased and the height of a peak is gradually increased from left to right within the scanning range. To the contrary, in the output waveform detected through the slit 1Y, the width of the waveform is gradually increased and the height of a peak is gradually decreased from left to right within the scanning range.

Figure 8A:
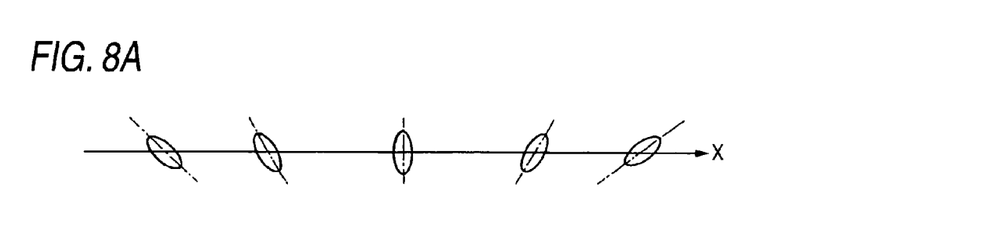
Figure 8B:
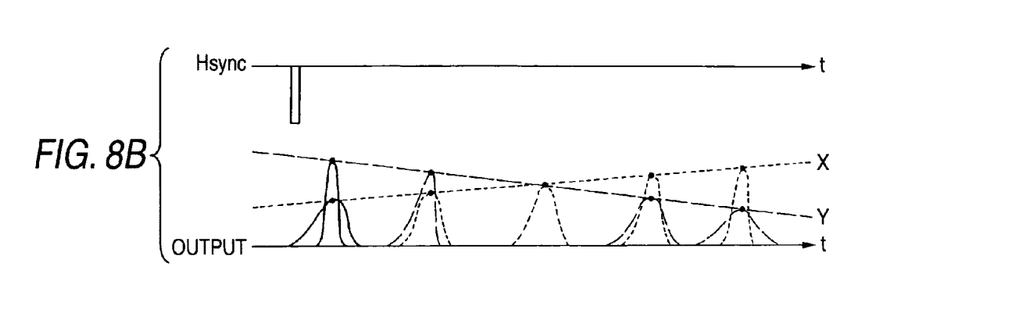

When the scanning light beam B obtained by the light scanning device 100 is deflected periodically and repetitively in the same manner as in FIG. 4 by using the slit plate 11 shown in FIG. 6, and the output waveform obtained from the optical sensor 12 provided behind the slit plate 11 is triggered by the horizontal synchronization signal $H_{sync}$, a graph shown typically in FIG. 8B is obtained by collectively displaying peak values of the output signals obtained by the periodic deflections. Here, FIG. 8A is a diagram showing the shape of the beam spot S along the scanning line "a" in FIG. 7A. While the output waveform detected through the slit 1X and the output waveform detected through the slit 1Y are drawn in the same position along a time base "t" in FIG. 8B, a time difference corresponding to the positional shift of the slit 1X and the slit 1Y is actually made (see FIG. 10).

In a display on the screen of the oscilloscope 16 shown in FIG. 8B, a curve X obtained by collectively displaying the peak values of the output waveforms detected through the slit 1X can easily be distinguished from a curve Y obtained by collectively displaying the peak values of the output waveforms detected through the slit 1Y, and they fluctuate opposite to each other depending on positions in the x-axis direction, respectively. Therefore, it is possible to visually grasp that the inclination of the beam spot S in the primary scanning direction is changed continuously depending on the position. In this case, there is a problem in that a density and coloring (tone/hue) are changed in an obtained image.

Figure 9A:
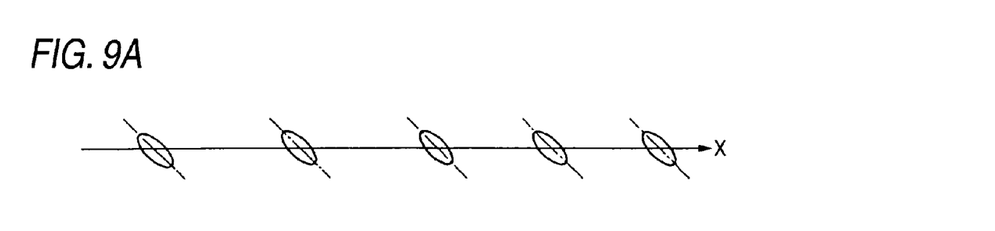
FIGS. 9A and 9B are views for explaining measured results in a case where an inclined angle of a beam spot is not varied.
Figure 9B:
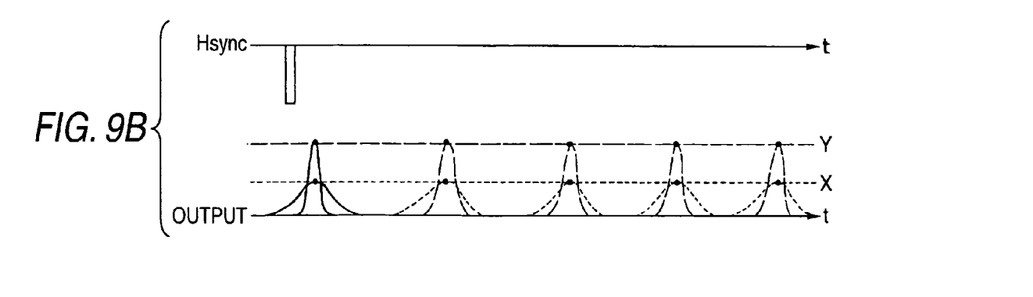

On the other hand, FIGS. 9A and 9B show a case where the shape of the beam spot S along the scanning line "a" is inclined in the same direction and is rarely changed within the scanning range. In this case, as shown in FIG. 9B, the curve X obtained by collectively displaying the peak values of the output waveforms detected through the slit 1X is different from the curve Y obtained by collectively displaying the peak values of the output waveforms detected through the slit 1Y, but they rarely fluctuate depending on positions in within the scanning range. Consequently, it is possible to visually grasp that the inclination of the beam spot S is not changed depending on the position in the primary scanning direction. As in this example, if the inclination of the beam spot S is uniform within the scanning range, it is possible to carry out a correction by changing the process conditions of an electrophotography (e.g., a bias voltage and an exposing energy). Therefore, there is no problem in respect of the quality of an obtained image.

Figure 10:
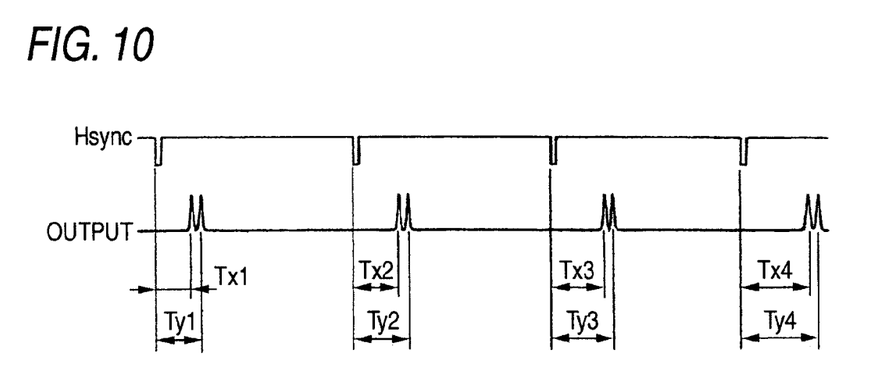
FIG. 10 is a time chart showing signals shown in FIGS. 8A through 9B in a time-serial manner.

In a case where the slit plate 11 having the slits 1X and 1Y arranged in the primary scanning direction is used, a detection signal obtained from the optical sensor 12 when the detecting system constituted by the slit plate 11 and the optical sensor 12 is continuously moved at a constant velocity along the scanning line "a" actually has an output waveform shown in FIG. 10 with respect to the horizontal synchronization signal $H_{sync}$ sent from the horizontal synchronization detector 15. Outputs are obtained with time delays $T_{Xn}$ and $T_{Yn}$ (n corresponds to the number of times of a deflection) from the horizontal synchronization signal $H_{sync}$ at the number of times of the deflection depending on positions in the x-axis direction of the slits 1X and 1Y at that time every deflection, respectively. By collectively displaying the respective peak values of the detection signals with the horizontal synchronization signal $H_{sync}$ to be a trigger, it is possible to obtain graphs shown typically in FIGS. 8B and 9B.

With the above configurations, it is possible to execute the continuous measurement and evaluation for the twist of the scanning light beam B in accordance with the position in the primary scanning direction. This method is advantageous in the evaluation of such a scanning optical system in which a light beam is incident on a reflection face of a rotary deflector such as a polygon mirror while being inclined in a secondary scanning direction relative to the optical axis (cf., Japanese Patent Publication No. 53-31147A). It is also advantageous in the evaluation of such a scanning optical system for focusing a light beam deflected by a deflector on a scanned face, wherein at least one optical face in the optical system is eccentrically provided relative to an optical axis of a light scanning device, or inclined in a secondary scanning direction relative to the optical axis. It is also advantageous in the evaluation of such a scanning optical system in which a light beam is twice incident on a reflection face of a deflector.

Figure 11A:
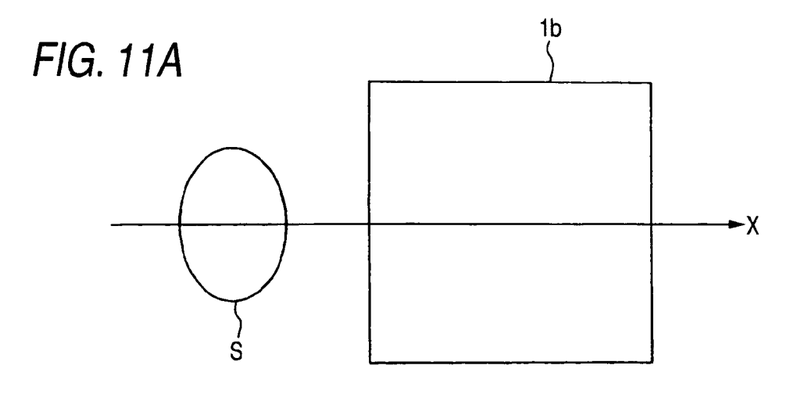
FIGS. 11A and 11B are diagrams for explaining a measurement principle of a measuring apparatus according to a third embodiment of the invention.
Figure 11B:
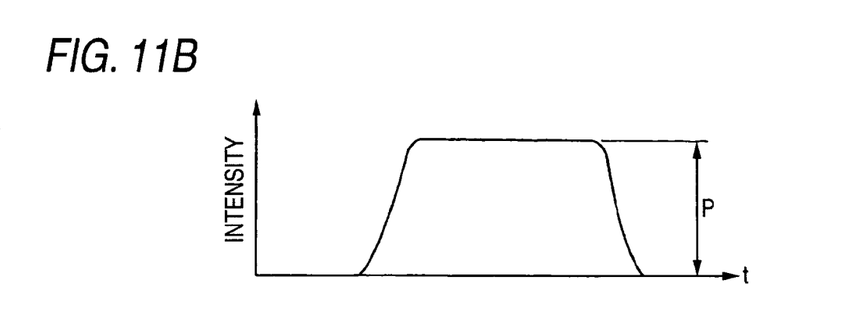

In the above embodiments, the slit 1a provided on the slit plate 11 has a smaller width than the dimension of the beam spot S. However, if a slit 1b having a greater width than a dimension in the primary scanning direction of the beam spot S is provided as shown in FIG. 11A, it is possible to detect the power of the beam spot S. This case will be described below in detail as a third embodiment of the invention. The slit 1b has a width in the primary scanning direction (x-axis) which is greater than the dimension of the beam spot S as described above. The moving velocity of the slit plate 11 is set to be sufficiently lower than that of the scanning light beam B. In a case where the beam spot S is moved over the slit 1b in the x direction, an optical power waveform obtained from the optical sensor 12 provided behind the slit plate 11 is shown in FIG. 11B, and a peak value P represents a value which is proportional to the power of the scanning light beam B without depending on the focal condition of the scanning light beam B.

Figure 12:
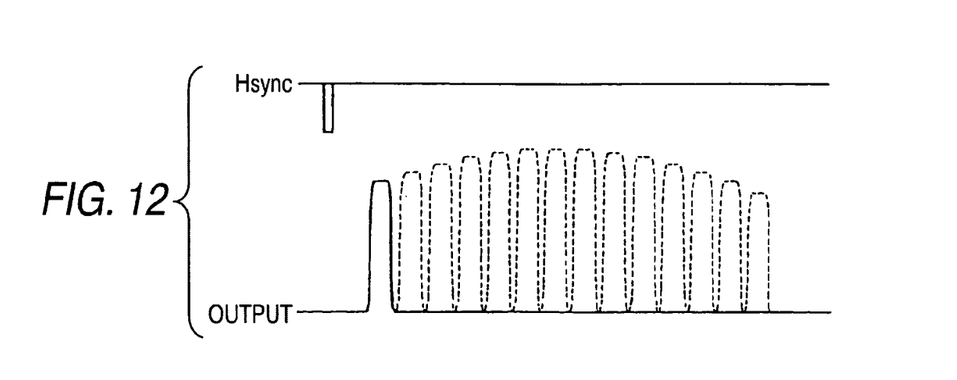
FIG. 12 is a time chart showing a measured result obtained in the apparatus of FIG. 11A.

The slit plate 11 is moved at a sufficiently lower velocity than the moving velocity of the scanning light beam B. Since the light scanning device 100 deflects the scanning light beam B periodically and repetitively, when the horizontal synchronization signal $H_{sync}$ is used as a trigger, the output waveform of the optical sensor 12 corresponding to the latter deflection (latter position on the scanning line) is displayed on the screen of the oscilloscope 16 at a position farther from the horizontal synchronization signal $H_{sync}$ as shown in FIG. 12. Here, a curve connecting the peak values of the thus obtained output signals shows a change in the power of the beam spot S in the primary scanning direction. Thus, it is possible to continuously measure a change in the optical power of the scanning light beam B within a scanning range by consecutively acquiring the peak value of the output waveform every deflection of the scanning light beam B while moving the slit 1a at a sufficiently low velocity in the primary scanning direction. That is, the same result as is obtained by the measurement of the optical power distribution with a one-dimensional optical sensor having a length over an entire scanning width.

If a local irregularity is found in the obtained curve shown in FIG. 12, it is caused by dust or shading in the optical system. Suitably combining this method with the method of the first embodiment (the detection of the local irregularity C shown in FIG. 5), it is possible to easily estimate the cause of each of the local irregularities.

In general, moreover, a scanning optical system has a characteristic (shading) in which the optical power at an end portion thereof is more reduced than that in a central part thereof. By the method of this embodiment, it is possible to easily distinguish whether the degree of the reduction is proper in respect of a designed value or is abnormally increased due to the drawbacks of coating of a mirror.

In the above embodiments, the table 13 integrally provided with the slit plate 11 and the optical sensor 12 is moved along the scanning line "a" on the scanned face. However, the slit plate 11 may be moved along the optical axis of the light scanning device 100 in order to measure and evaluate a beam waist position of the scanning light beam B. This case will be described below in detail as a fourth embodiment of the invention, with reference to FIG. 13. Same components as those in the first embodiment will be designated by the same reference numerals, and repetitive explanations for those will be omitted.

Figure 13:
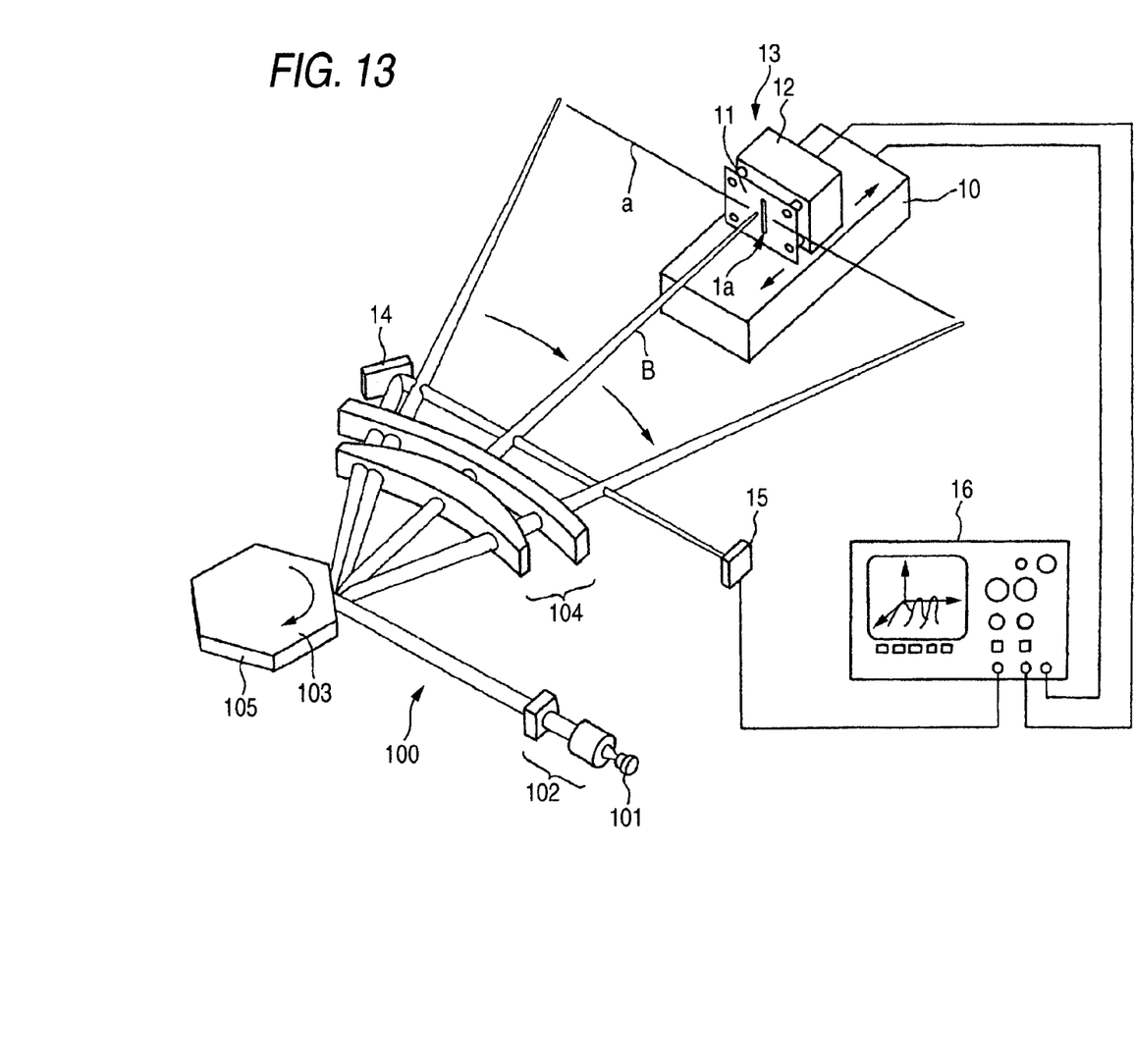
FIG. 13 is a schematic view of a measuring apparatus according to a fourth embodiment of the invention.

In this embodiment, the direction of the arrangement of a motorized stage 10 is identical to the direction of the optical axis of the light scanning device 100, and the optical axis is coincident with the central axis of a scanning light beam B in the incidence of the scanning light beam B on the center of a scanning line "a". This direction is set to be a z-axis. A movable table 13 attached onto the stage 10 is moved so that a slit plate 11 is moved along the z-axis.

A connection is carried out in such a manner that a signal sent from a horizontal synchronization detector 15 is input as a horizontal synchronization signal to an oscilloscope 16, a signal sent from the optical sensor 12 is input as the signal of the oscilloscope 16, and furthermore, a position signal on the optical axis of the slit plate 11 on the movable table 13 is input as a z-coordinate signal from the stage 10.

Figure 14:
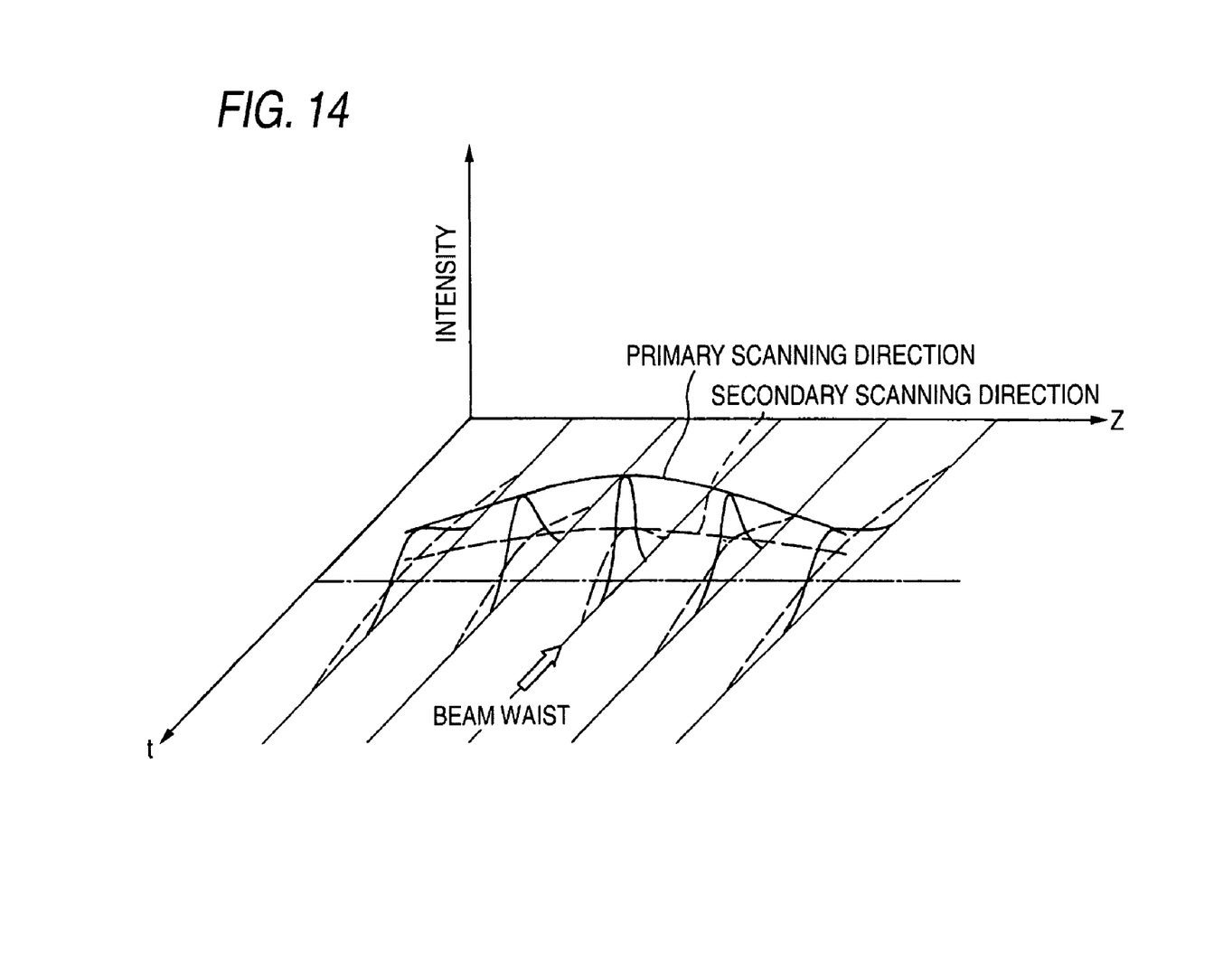
FIG. 14 is a diagram for explaining a measurement principle of the apparatus of FIG. 13.

In such an arrangement, a three-dimensional display of the measured results is performed on a screen of the oscilloscope 16, in which the horizontal synchronization signal sent from the horizontal synchronization detector 15 is used as a trigger and a time axis t and a z-coordinate position are associated with each other, as shown in FIG. 14. In this embodiment, the slit 1a is extended in the direction perpendicular to the x-axis (secondary scanning direction) as shown in FIG. 13, and beam profiles in connection with the primary scanning direction are displayed as shown in the solid lines in FIG. 14. As discussed later, it is possible to display beam profiles in connection with the secondary scanning direction as shown in the dashed lines in FIG. 14

A curve connecting peak values of the respective beam profiles in FIG. 14 indicates a change in the peak intensity in the direction of the optical axis (z-axis), and the highest position of the curve (a position in which the optical power is the largest) represents a beam waist position on the optical axis of the scanning light beam B.

In addition to the slit 1a extending in the secondary scanning direction, there may be provided an oblique slit extending in a direction which is almost parallel to the scanning line "a". With this configuration, it is possible to collectively display also a curve showing a beam waste position in the secondary scanning direction (the dashed lines in FIG. 14). Therefore, it is possible to measure and evaluate both of the beam waist positions in the primary and secondary scanning directions at the same time.

When the beam waist position in the secondary scanning direction is to be measured, particularly, the scanning light beam B is incident on the scanned face at an angle which is not perpendicular in portions other than the center of a scanning range. When the oblique slit which is almost parallel with the scanning line "a" is moved in a direction along the optical axis in that position, the position of an output waveform is varied in the primary scanning direction. In a case where a precise measurement is to be carried out, it is also necessary to move the oblique slit in the primary scanning direction in order to correct the measurement.

To the contrary, when a waveform is triggered with a horizontal synchronization signal and is thus collectively displayed by utilizing the fact that the position of the waveform is shifted in the primary scanning direction as described above, it is easy to visually confirm the beam waist position.

Figure 15:
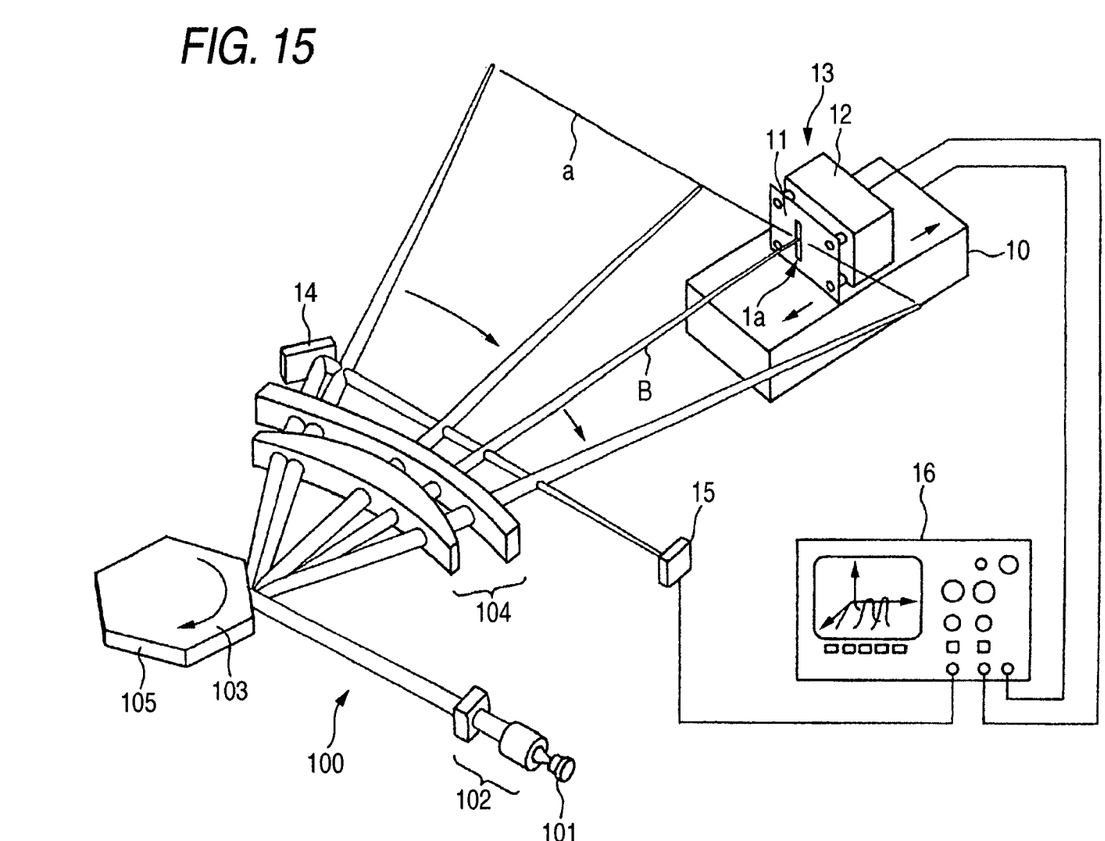
FIG. 15 is a schematic view of a modified example of the measuring apparatus of FIG. 13.

In this embodiment, the beam waist position of the scanning light beam B advancing in the optical axis direction of the light scanning device 100 is measured and evaluated. However, a beam waist position of the scanning light beam B to be incident on a specific position in the primary scanning direction of a scanned face also can be measured and evaluated. In this case, as shown in FIG. 15, the stage 10 is disposed such that the table 13 is movable in a direction coincident with an axis of the scanning light beam B at the specific position in the primary scanning direction. By collectively displaying output waveforms sent from the optical sensor 12 at the respective measuring positions provided along the moving path of the table 13. It is possible to measure and evaluate the beam waist position in such a condition by the three-dimensional display thus obtained.

Here, it is practically possible to measure and evaluate the beam waist position of the scanning light beam B to be incident on a specific position in the primary scanning direction of the scanned face by a configuration that the stage 10 is moved in the optical axis of the light scanning device 100 at the specific position in the primary direction. In this case, measurement operation can be facilitated.

Figure 16:
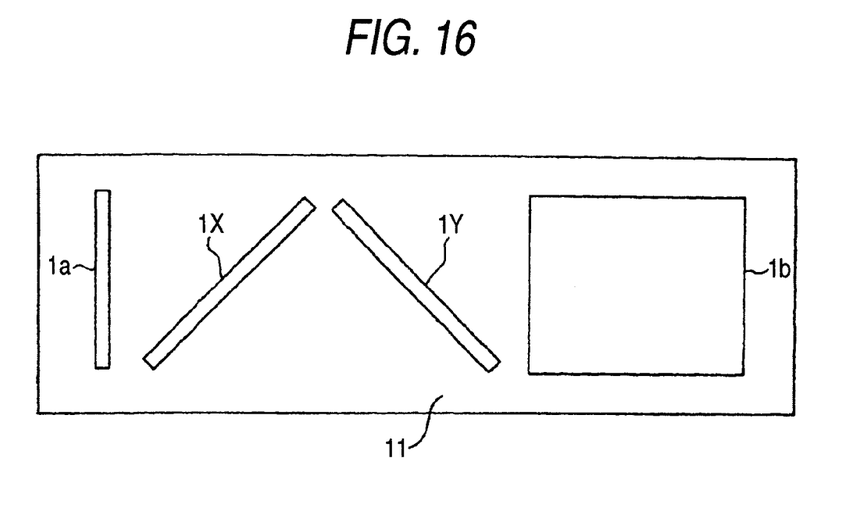
FIG. 16 is a plan view of a modified example of the slit plate of FIG. 6. the scanning light is deflected a plurality of times.

As shown in FIG. 16, there may be adopted a slit plate 11 in which a slit 1a having a smaller width than a dimension in the primary scanning direction of a beam spot S and extending in the secondary scanning direction; a slit 1X having a small width and inclined at +45 degrees relative to the secondary scanning direction; a slit 1Y having a small width and inclined at −45 degrees relative to the secondary scanning direction; and a slit 1b having a greater width than the dimension in the primary scanning direction of the beam spot S and extending in the secondary scanning direction are arranged in the primary scanning direction, so that a plurality of slits are collectively moved in the primary scanning direction. With such a configuration, it is possible to obtain the curves shown in FIGS. 5, 8B and 12 at the same time. Even if the plural slits are used at the same time, by synchronizing with a horizontal synchronization signal $H_{sync}$, it is always possible to obtain corresponding data at any position in the primary scanning direction irrespective of the moving velocity of a detecting system constituted by the slit plate 11 and the optical sensor 12.

The slit plate 11 may be provided with only one slit 1a having a smaller width than the dimension of the beam spot S, and the slit plate 11 may be configured to be rotatable relative to the optical sensor 12. With this configuration, the single slit 1a can serve to detect the characteristics of the beam spot S in the primary scanning direction and the secondary scanning direction.

In connection with the second embodiment, the single slit is applicable instead of the slit plate shown in FIG. 6 in which two oblique slits 1X and 1Y are formed. Specifically, the single slit is first inclined at +45 degrees relative to the secondary scanning direction and subjected to the first measurement. Then, the single slit is rotated so as to be inclined at −45 degrees relative to the secondary scanning direction and subjected to the second measurement. By collectively displaying the thus obtained outputs, the same result as in the second embodiment can be obtained.

For the slits 1a, 1b, 1X and 1Y, it is possible to carry out antireflection coating over a glass plate and to form a shielding layer other than the slit portion thereon, thereby easily fabricating a fine glass slit with high precision. Alternatively, it is also possible to constitute them as air slits having slit portions to be through holes. Furthermore, it is also possible to constitute the air slit by a knife edge.

A method for fabricating the glass slit and the air slit will be described in detail. For the glass slit, it is suitable to employ a method for partially removing a shielding layer constituted by a thin metallic film formed on a glass by photoetching or a method for directly carrying out heating and removal with a laser beam. For the air slit, moreover, it is possible to form a fine slit by processing a thin metallic plate through the photoetching or the laser beam in the same manner as described above. In addition, it is also possible to form a slit with high precision by a precise discharge machining.

Furthermore, the two oblique slits 1X and 1Y shown in FIG. 6 can also be constituted to freely regulate an angle formed by the two slits 1X and 1Y.

It is desirable to use a high-velocity response sensor such as a PIN photodiode for the optical sensor 12 to be provided behind the slit plate 11. If the area of the optical sensor is large, generally, a high-speed responsiveness is deteriorated. Therefore, it is necessary to select the size and arrangement of the slit so that the measurement can be carried out by a sensor having an area which is as small as possible.

In a case where a reflection over the surface of a sensor package causes a problem, it is necessary to select a resin mold or an element having no glass window.

The relationship between the width of the slit and the dimension of the beam spot S is preferably based on the disclosure of Japanese Patent Publication No. 64-13514A. A slit having a smaller width than the dimension of the beam spot S is required for measuring a focal condition. If the width of the slit is too small, however, there is a problem in that the optical power which can be received by the optical sensor is decreased. In a spot size (diameter defined at an intensity level which is $1/e^2$ of the peak value) of approximately 50 to 100 μm to be used in a general laser printer, it is preferable that the width of the slit should be 5 to 20 μm.

By using the slit 1X or 1Y having a smaller width than the dimension of the beam spot S inclined at ±45 degrees relative to the x-axis, and previously measuring the accurate position of the slit, it is possible to continuously measure the position in the secondary scanning direction of the scanning light beam B. Moreover, the curvature of the scanning line "a" can also be measured continuously. In this case, the position of the scanning light beam B in the primary scanning direction is first measured by using the slit 1a extending in the secondary scanning direction, and the position in the secondary scanning direction is determined by a difference between detection timing of the slit 1a and the slit 1X or 1Y. This is because it is hard to separate the position in the primary scanning direction from the position in the secondary scanning direction with only the slit 1X or 1Y.

When a plurality of slits is formed on one substrate as shown in FIGS. 6 and 16, the optical sensor 12 to be provided therebehind may be single or a plurality of optical sensors having small light receiving areas may be arrayed behind the slit plate 11 because the response characteristic of an element having a smaller light receiving area is more excellent as described above. In that case, it is possible to obtain an advantage that signals can be individually fetched corresponding to the slits. In a case where the outputs of the optical sensors are calculated to obtain a result (for example, in a case where the twist of the beam spot S is measured at an optical power ratio through the slits 1X and 1Y), it is necessary to regulate or calibrate the output values of the optical sensors to be equal to each other.

While it is possible to obtain the advantage that the focal condition and the fluctuation in the optical power can be grasped visually by collectively displaying a waveform over the screen of the oscilloscope 16 in each of the embodiments described above, it is also possible to automatically decide the result of the check values of the focal condition and the fluctuation in the optical power by sequentially recording the peak value of a waveform automatically every scan, approximating to a two-dimensional curve based on the wave height of a peak and a position on a time base, for example, and comparing the coefficient of the curve. In addition, it is possible to store the characteristic measured values for each of the products of the light scanning devices, thereby using them as quality control data practically.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A measuring method, comprising steps of:
providing a light scanning device, operable to repetitively deflect a light beam within a first range in a first direction at a first velocity;
providing a plate formed with at least one slit extending in a direction angled from the first direction and having a constant width;
moving the plate within the first range in the first direction at a second velocity which is sufficiently lower than the first velocity;
detecting a peak value of an optical power of light passing through the slit every time when the deflected light beam crosses the slit being moved, thereby obtaining peak values at plural positions in the first direction; and
displaying the peak values on a screen collectively in such a manner that positions on the screen correspond to the positions in the first direction.

2. The measuring method as set forth in claim 1, wherein:
the width of the slit is narrower than a dimension in the first direction of a beam spot formed by the deflected light beam incident on the plate; and
the slit extends in a direction perpendicular to the first direction.

3. The measuring method as set forth in claim 1, wherein:
the plate is formed with a plurality of slits extending in directions different from each other; and
the width of each of the slits is narrower than a dimension in the first direction of a beam spot formed by the deflected light beam incident on-the plate.

4. The measuring method as set forth in claim 1, wherein:
the width of the slit is wider than a dimension in the first direction of a beam spot formed by the deflected light beam incident on the plate; and
the slit extends in a direction perpendicular to the first direction.

5. The measuring method as set forth in claim 1, wherein the deflection of the light beam is based on a synchronization signal, and the peak values are collectively displayed with reference to the synchronization signal.

6. The measuring method as set forth in claim 1, wherein the first velocity is lower than a velocity that the light scanning device deflects the light beam in an actual use.

7. A measuring method, comprising steps of:
providing a light scanning device, operable to repetitively deflect a light beam within a first range in a first direction at a first velocity;
providing a plate formed with at least one slit extending in a direction angled from the first direction and having a constant width;
moving the plate along an optical axis of the light scanning device or the deflected light beam at a specific position within the first range and at a second velocity which is sufficiently lower than the first velocity;
detecting a peak value of an optical power of light passing through the slit every time when the deflected light beam crosses the slit being moved, thereby obtaining peak values at plural positions in the first direction; and
displaying the peak values on a screen collectively in such a manner that positions on the screen correspond to the positions in the first direction.

8. The measuring method as set forth in claim 7, wherein the deflection of the light beam is based on a synchronization signal, and the peak values are collectively displayed with reference to the synchronization signal.

9. The measuring method as set forth in claim 7, wherein the first velocity is lower than a velocity that the light scanning device deflects the light beam in an actual use.

10. An apparatus for measuring a characteristics of a light beam which is repetitively deflected by a light scanning device within a first range in a first direction at a first velocity, the measuring apparatus comprising:
a plate, having a first face opposing to the light scanning apparatus and formed with at least one slit extending in a direction angled from the first direction and having a constant width;
an optical sensor, disposed so as to oppose to a second face of the plate which is opposite to the first face;
an actuator, which integrally moves the plate and the optical sensor within the first range in the first direction at a second velocity which is sufficiently lower than the first velocity, so that a peak value of an optical power of light passing through the slit every time when the deflected light beam crosses the slit being moved, thereby causing the optical sensor to output peak values at plural positions in the first direction; and
a display, having a screen adapted to collectively display the peak values sent from the optical sensor, in such a manner that positions on the screen correspond to the positions in the first direction with reference to the synchronization signal.

11. The measuring apparatus as set forth in claim 10, wherein:
the width of the slit is narrower than a dimension in the first direction of a beam spot formed by the deflected light beam incident on the plate; and
the slit extends in a direction perpendicular to the first direction.

12. The measuring apparatus as set forth in claim 10, wherein:
the plate is formed with a plurality of slits extending in directions different from each other; and the width of each of the slits is narrower than a dimension in the first direction of a beam spot formed by the deflected light beam incident on the plate.

13. The measuring apparatus as set forth in claim 10, wherein:
  the width of the slit is wider than a dimension in the first direction of a beam spot formed by the deflected light beam incident on the plate; and
  the slit extends in a direction perpendicular to the first direction.

14. The measuring apparatus as set forth in claim 10, wherein the deflection of the light beam is based on a synchronization signal, and the peak values are collectively displayed with reference to the synchronization signal.

15. The measuring apparatus as set forth in claim 10, wherein the first velocity is lower than a velocity that the light scanning device deflects the light beam in an actual use.

16. An apparatus for measuring a characteristics of a light beam which is repetitively deflected by a light scanning device within a first range in a first direction at a first velocity, the measuring apparatus comprising:
  a plate, having a first face opposing to the light scanning apparatus and formed with at least one slit extending in a direction angled from the first direction and having a constant width;
  an optical sensor, disposed so as to oppose to a second face of the plate which is opposite to the first face;
  an actuator, which integrally moves the plate along an optical axis of the light scanning device or the deflected light beam at a specific position within the first range and at a second velocity which is sufficiently lower than the first velocity, so that a peak value of an optical power of light passing through the slit every time when the deflected light beam crosses the slit being moved, thereby causing the optical sensor to output peak values at plural positions in the first direction; and
  a display, having a screen adapted to collectively display the peak values sent from the optical sensor, in such a manner that positions on the screen correspond to the positions in the first direction with reference to the synchronization signal.

17. The measuring apparatus as set forth in claim 16, wherein the deflection of the light beam is based on a synchronization signal, and the peak values are collectively displayed with reference to the synchronization signal.

18. The measuring apparatus as set forth in claim 16, wherein the first velocity is lower than a velocity that the light scanning device deflects the light beam in an actual use.

* * * * *